April 22, 1941. J. NEUFELD 2,239,466
METHOD OF AND APPARATUS FOR ELECTRICAL INVESTIGATION OF DRILL HOLES
Filed May 7, 1937 2 Sheets-Sheet 1

INVENTOR
Jacob Neufeld

April 22, 1941.  J. NEUFELD  2,239,466
METHOD OF AND APPARATUS FOR ELECTRICAL INVESTIGATION OF DRILL HOLES
Filed May 7, 1937  2 Sheets-Sheet 2

INVENTOR
Jacob Neufeld

Patented Apr. 22, 1941

2,239,466

UNITED STATES PATENT OFFICE 2,239,466

METHOD OF AND APPARATUS FOR ELECTRICAL INVESTIGATION OF DRILL HOLES

Jacob Neufeld, Tulsa, Okla., assignor to Well Surveys, Incorporated, Tulsa, Okla., a corporation of Delaware Application May 7, 1937, Serial No. 141,361

14 Claims. (Cl. 175—182)

This invention has to do broadly with the exploration of earth formations by electrical methods, but relates more particularly to electrical explorations conducted through drill holes and has special application in connection with the mapping of formations penetrated by oil wells, water wells, and the like.

According to heretofore practiced methods electrical measurements have been frequently applied for the reconnaissance of beds traversed by a drill hole. These measurements have been usually performed under steady state conditions. Thus in some instances a steady unidirectional electrical field has been produced within the drill hole and resistance measurements have been performed at various depths in order to distinguish and to identify various geological formations traversed by the bore hole. In other instances, an alternating electrical field has been produced in the drill hole and measurements have been performed upon the magnitude and phase angle of the electrical field at various depths of the hole. Since phase displacements depend partly on the dielectric constants of the various formations which are traversed by the electric alternating field, the latter method rendered it possible to identify the said formations by their dielectric constants.

In contrast to these previously practiced methods, the present invention consists in producing a transient electrical field within the drill hole, and is based on observation that the manner in which various formations react upon the transient electrical field can be represented in form of measurable and characteristic effects which render it possible to distinguish the said formations and to locate the boundaries between the same. In accordance herewith, the present method consists principally in filling the drill hole to be investigated, with water or other liquid which is conductive to electric current, and in producing in the drill hole thus filled with liquid a transient electrical field which is then determined at different points of the drill hole.

The apparatus employed for carrying out the present method may suitably consist of two electrodes capable of being suspended at various depths in the liquid filled drill hole, said electrodes being connected through insulated conductors with a suitable source of a transient voltage so that an electric transient field may thus be generated in a drill hole, and of two auxiliary pick-up electrodes adapted to be suspended in the same drill hole and which are connected through insulated conductors with a recording instrument.

The novel features which I believe to be characteristic of my invention are set forth with particularity in the appended claims. My invention, itself, however, both as to its organization and method of operation, together with objects and advantages thereof, will be better understood by reference to the following description taken in connection with the accompanying drawings in which:

Figure 1:
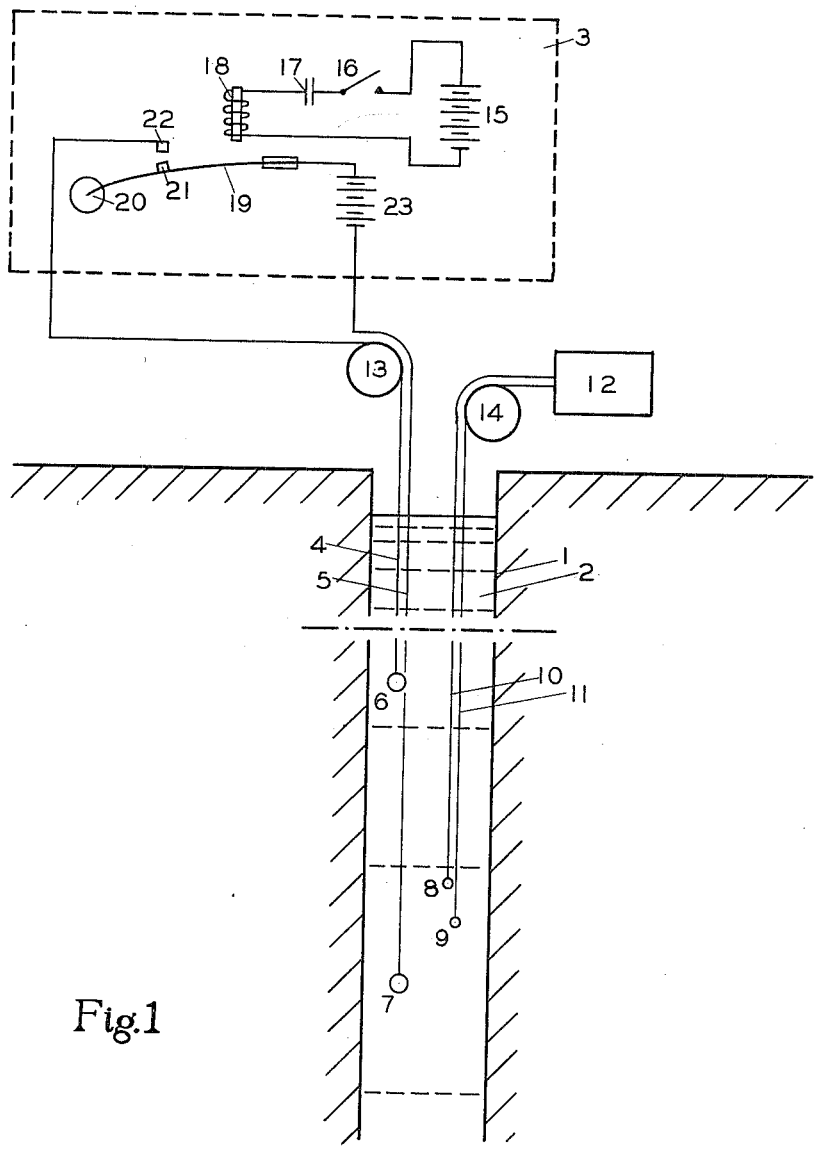
Figure 1 represents diagrammatically an apparatus, according to my invention.

Referring now more particularly to Figure 1, an uncased bore hole 1 containing drilling fluid 2 is shown penetrating a formation to be explored. It may be assumed that the bore hole is in an oil field and intended to be a productive well, the fluid 2 consisting of the usual drilling fluid containing a suitable mud, which fluid was left in the hole following removal of the drill.

The exploring apparatus proper consists of an impulse generator 3 connected through the insulated conductors 4, 5 to two electrodes 6, 7 suspended at different depths in the water filled hole.

Two exploring electrodes 8, 9 are provided in the hole, and are connected by means of insulated conductors 10, 11 respectively to the voltage recorder 12 adjacent to the top of the well. The recorder contains a galvanometer which responds to the transient voltage induced between the electrodes 8 and 9 and causes beam of light to displace itself and to produce a photographic record on a moving film. The moving film is driven at a uniform speed by a rotating drum or other device and produces a record of the motion of the galvanometer.

The insulated conductors 4, 5, and 10, 11 have individually a total length somewhat in excess of the depth of the hole to be explored and are normally wound on drums 13 and 14, respectively, positioned adjacent to the top of the well.

The impulse generator 3 includes a battery 15 in series with switch 16, condenser 17, and electromagnet winding 18. By closing the switch 16, an impulse is sent into the circuit which energizes momentarily the electromagnet 18 and causes it to attract the armature 19. The armature 19 consists of an elastic bar terminated by the mass 20 and is capable under the influence of the transient current of the electromagnet to produce one single oscillation and thus to close the contacts between 21 and 22 for a predetermined time interval. The contacts 21 and 22 close a circuit which consists of a battery 23 supplying current to the electrodes 6 and 7.

Figure 2:
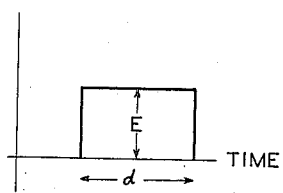
Figure 2 represents diagrammatically a voltage transient generated by means of the arrangement of Figure 1.

In such a manner by closing the switch 16, the battery 23 produces across its terminals a transient voltage $a$ substantially rectangular form as shown in Figure 2. It is noted that the magnitude of this voltage E is determined by the battery and its duration $d$ is determined by the length of the time interval during which the contacts 21 and 22 are electrically connected, and depends upon the elastic constant of the armature 19 and the mass 20. The rectangular voltage shown in Figure 2 creates a transient electrical field which distributes itself throughout the drill hole and varies at each point of the drill hole in a manner which depends essentially upon the electrical characteristics of the adjacent earth formations. This electrical field is investigated by means of exploring electrodes 8 and 9 which are capable of being suspended at different depths in the drill hole. The exploring electrodes are adapted to transmit to the recorder 12 through the conductors 10, 11 a transient voltage which represents the difference of potential between the points at which the electrodes are located. Such transient voltage recorded at 12 is shown in Figure 3.

Figure 3:
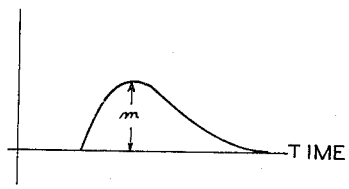
Figure 3 represents diagrammatically a voltage transient induced across the exploring electrodes of the arrangement of Figure 1.

It is apparent that the form of the transient shown in Figure 3 depends upon the electrical characteristic of the strata adjacent to electrodes 8, 9, and by lowering the exploring electrodes different transients are obtained which represent the electrical characteristics of the lower subsurface strata.

Figure 4:
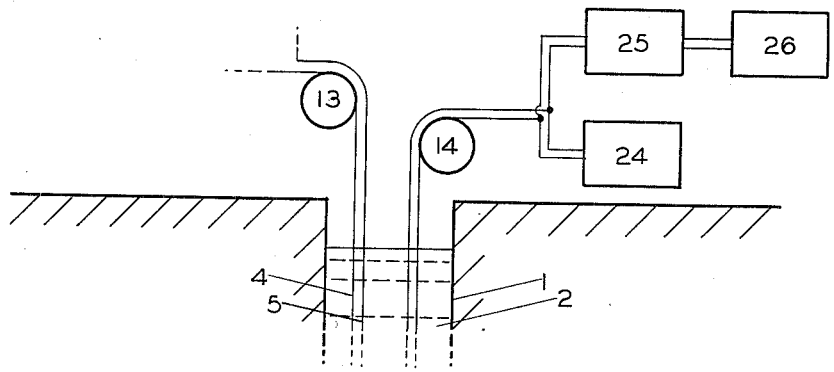
Figure 4 represents a fragment of a modified embodiment of my invention.

Figure 4 gives a fragmentary view of some modifications of the arrangement of Figure 1. Namely, the recorder 12 has been eliminated and the insulated wires 10 and 11 are connected to blocks 24 and 25. Block 24 represents a peak voltmeter capable of recording the maximum value of the impressed transient, such a maximum value being represented by $m$ in Figure 3. Block 25 represents a derivator adapted to produce across its output terminals a transient which varies as a time derivative of the transient impressed across its input terminals. The derivator may be of any type known in the art such as for instance, the one described in pages 22–23 of the U. S. patent application Serial No. 128,264 relating to a "Method and apparatus for seismic prospecting" filed by S. A. Scherbatskoy and J. Neufeld, the said derivator being designated by the numeral 150 in Figure 4a of the said patent application. By the expression derivator as used in the specification and in the sub-joined claims is meant a device sensitive to a fluctuating electrical input current which produces an output current fluctuating in a manner proportional to the time derivative, that is, the rate of fluctuation of the input current. The output terminals 25 are connected to block 26 which is substantially similar to block 24 and is capable of recording the maximum value of the slope of the transient of the type shown in Figure 3.

In such a manner I have provided means and method for recording maximum value and maximum slope of transient voltages induced at various points in a drill hole. These two values constitute measurable and characteristic quantities which render it possible to distinguish various formations from each other and to locate the boundaries between the same.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

What I claim as new and desire to secure by Letters Patent of the United States is:

1. Apparatus for electrically investigating characteristic differences between geologic strata traversed by a bore hole, comprising in combination two electrodes capable of being suspended at different depths in the bore hole, a source of transient voltage, insulated conductors connecting said electrodes to the said source, two exploring electrodes adapted to be suspended at different depths in the bore hole, a peak voltmeter, a derivator, and insulating conductors connecting said exploring electrodes to the said peak voltmeter and to the said derivator, another peak voltmeter and electrical connections between the derivator and the said other peak voltmeter.

2. Apparatus for electrically investigating characteristic differences between geologic strata traversed by a bore hole, comprising in combination two electrodes capable of being suspended at different depths in the bore hole, a source of transient voltage, insulated conductors connecting said electrodes to the said source, two exploring electrodes adapted to be suspended at different depths in the bore hole, a derivator, insulating conductors connecting said derivator, a peak voltmeter and electrical connections between the derivator and the peak voltmeter.

3. The method of determining the nature of strata adjacent a well bore that comprises repeatedly passing a transient electric current between spaced points along said well bore, simultaneously measuring between other spaced points along said well bore the maximum developed potential and the maximum rate of development of said potential and correlating said measurements with measurements of the depths at which they are made.

4. Apparatus useful in well surveying comprising a plurality of first electrodes capable of being suspended in spaced relationship within a well bore, a source of transient voltage, insulated conductors electrically connecting said first electrodes with said source, a plurality of second electrodes capable of being suspended within a well bore, a derivator, and insulated conductors electrically connecting said second electrodes with said derivator.

5. Method of determining characteristics of subterranean geological strata traversed by a well bore that comprises repeatedly passing a transient electric current between vertically spaced points within said well bore, simultaneously measuring the maximum rate of development of electropotential between other vertically spaced points within the well bore, and correlating the measurements so obtained with measurements of depth.

6. A method of well surveying that comprises making a geophysical measurement within a well bore the rate of change of which is a significant indication of geological structure, creating in an electrical circuit a voltage related proportionally to said measurement, measuring the voltage and electrically derivating said voltage with respect to time to produce a signal voltage proportional to the time derivative of the first mentioned current and indicating said derived voltage.

7. Apparatus useful in well surveying that comprises means for making a geophysical measurement within a well bore the rate of change of which is a significant indication of geological structure, means for producing an electrical voltage proportional to said measurement, means for measuring said voltage and an electrical derivator for producing a voltage proportional to the time derivative of the first mentioned voltage.

8. A method of determining the nature of strata surrounding a well bore or the like that comprises repeatedly transmitting transient currents between vertically spaced points within said well bore, simultaneously measuring potential differences between other vertically spaced points within the well bore, deriving therefrom a voltage proportionally related to the rate of development of said measured potential differences measuring said voltage and correlating said measurements of the voltage with measurements of the depths at which they are taken.

9. A method of well surveying that comprises making a geophysical measurement within a well bore the rate of change of which is a significant indication of geological structure, creating in an electrical circuit a current related proportionally to said measurement, measuring the current, and electrically derivating said current with respect to time to produce a signal current proportional to the time derivative of the first mentioned current and indicating said derived current.

10. Apparatus useful in well surveying that comprises means for making a geophysical measurement within a well bore the rate of change of which is a significant indication of geological structure, means for producing an electrical current proportional to said measurement, means for measuring said current, and an electrical derivator for producing a current proportional to the time derivative of the first mentioned current.

11. A method of well surveying that comprises making a geophysical measurement within a well bore the rate of change of which is a significant indication of geological structure, creating in an electrical circuit a current related proportionally to said measurement, electrically derivating said current with respect to time to produce a signal current proportional to the time derivative of the first mentioned current, and indicating said derived current.

12. Apparatus useful in well surveying that comprises means for making a geophysical measurement within a well bore the rate of change of which is a significant indication of geological structure, means for producing an electrical current proportional to said measurement, and an electrical derivator for producing a current proportional to the time derivative of the first mentioned current.

13. A method of well surveying that comprises making within a well bore a geophysical measurement the rate of change of which is a significant indication of geological structure, creating in an electrical circuit a voltage related proportionally to said measurement, electrically derivating said voltage with respect to time to produce a signal voltage proportional to the time derivative of the first mentioned current, and indicating said derived voltage.

14. Apparatus useful in well surveying that comprises means for making a geophysical measurement within a well bore the rate of change of which is a significant indication of geological structure, means for producing an electrical voltage proportional to said measurement, and an electrical derivator for producing a voltage proportional to the time derivative of the first mentioned voltage.

JACOB NEUFELD.